United States Patent
Zhang

(10) Patent No.: US 11,317,078 B2
(45) Date of Patent: Apr. 26, 2022

(54) METHOD AND SYSTEM FOR AUTOMATIC EXPOSURE DETERMINATION FOR HIGH-RESOLUTION STRUCTURED LIGHT 3D IMAGING

(71) Applicant: Purdue Research Foundation, West Lafayette, IN (US)

(72) Inventor: Song Zhang, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 15/931,817

(22) Filed: May 14, 2020

(65) Prior Publication Data

US 2020/0382760 A1    Dec. 3, 2020

Related U.S. Application Data

(60) Provisional application No. 62/853,553, filed on May 28, 2019.

(51) Int. Cl.
*H04N 13/254*    (2018.01)
*H04N 13/296*    (2018.01)
*H04N 5/235*    (2006.01)

(52) U.S. Cl.
CPC ......... *H04N 13/254* (2018.05); *H04N 5/2353* (2013.01); *H04N 13/296* (2018.05)

(58) Field of Classification Search
CPC ... H04N 13/254; H04N 13/296; H04N 5/2353
See application file for complete search history.

(56) References Cited

U.S. PATENT DOCUMENTS

| | | | |
|---|---|---|---|
| 2008/0130016 A1* | 6/2008 | Steinbichler | G01B 11/2513 356/610 |
| 2010/0207938 A1* | 8/2010 | Yau | G06T 1/0007 345/419 |
| 2015/0233707 A1* | 8/2015 | Huntley | G01B 11/245 348/136 |
| 2018/0176463 A1* | 6/2018 | Shintani | H04N 5/23287 |
| 2018/0180407 A1* | 6/2018 | Inukai | G06T 7/521 |
| 2019/0379881 A1* | 12/2019 | Tewes | G06T 7/521 |

OTHER PUBLICATIONS

Zhang, S., "High-speed 3d shape measurement with structured light methods: a review," Optics and Lasers in Engineering, Mar. 2018, vol. 106, 119-131 (13 pages).

(Continued)

*Primary Examiner* — Mishawn N. Hunter
(74) *Attorney, Agent, or Firm* — Purdue Research Foundation

(57) ABSTRACT

A method and system are disclosed that can rapidly and automatically determine the optimal exposure time for high-quality three-dimensional (3D) shape measurement with digital fringe projection technique. The method only requires capturing a fringe pattern image with one exposure time to automatically determine a single global optimal exposure time for high quality 3D shape measurement. The method can be extended to automatically determine a plurality of optimal exposure times for HDR image capture.

13 Claims, 3 Drawing Sheets

(56) References Cited

OTHER PUBLICATIONS

Ekstrand, L. et al., "Auto-exposure for three-dimensional shape measurement with a digital-light-processing projector," Optical Engineering, Dec. 2011, vol. 50, No. 12, 123603 (7 pages).
Chen, B. et al., "High-quality 3d shape measurement using saturated fringe patterns," Optics and Lasers in Engineering, May 2016, vol. 87, 83-89 (7 pages).
Zhang, S. et al., "High dynamic range scanning technique," Optical Engineering, Mar. 2009, vol. 48, No. 3, 033604 (7 pages).
Waddington, C. et al., "Analysis of measurement sensitivity to illuminance and fringe-pattern gray levels for fringe-pattern projection adaptive to ambient lighting," Optics and Lasers in Engineering, 2010, vol. 48, 251-256 (6 pages).
Jiang, C. et al., "High dynamic range real-time 3d shape measurement," Optics Express, Apr. 2016, vol. 24, No. 7, 7337-7346 (10 pages).
Zheng, Y. et al., "Real-time high-dynamic-range fringe acquisition for 3d shape measurement with a rgb camera," Measurement Science and Technology, 2019, vol. 30, 075202 (11 pages).
Suresh, V. et al., "High-dynamic-range 3d shape measurement utilizing the transitioning state of digital micromirror device," Optics and Lasers in Engineering, Mar. 2018, vol. 107, 176-181(6 pages).
Salahieh, B. et al., "Multi-polarization fringe projection imaging for high dynamic range objects," Optics Express, Apr. 2014, vol. 22, No. 8, 10064-10071 (8 pages).
Lin, H. et al., "Three-dimensional shape measurement technique for shiny surfaces by adaptive pixel-wise projection intensity adjustment," Optics and Lasers in Engineering, Dec. 2016, vol. 91, 206-215 (10 pages).
Lin, H. et al., "Adaptive digital fringe projection technique for high dynamic range three-dimensional shape measurement," Optics Express, Apr. 2016, vol. 24, No. 7, 7703-7718 (16 pages).
Li, D. et al., "Adaptive fringe-pattern projection for image saturation avoidance in 3d surface-shape measurement," Optics Express, Apr. 2014, vol. 22, No. 8, 9887-9901 (15 pages).
Jiang, H. et al., "High dynamic range fringe acquisition: A novel 3-d scanning technique for high-reflective surfaces," Optics and Lasers in Engineering, Jun. 2012, vol. 50, 1484-1493 (10 pages).
Zhao, H. et al., "Rapid in-situ 3d measurement of shiny object based on fast and high dynamic range digital fringe projector," Optics and Lasers in Engineering, Sep. 2013, vol. 54, 170-174 (5 pages).

Feng, X. et al., "General solution for high dynamic range three-dimensional shape measurement using the fringe projection technique," Optics and Lasers in Engineering, Apr. 2014, vol. 59, 56-71 (16 pages).
Ri, S. et al., "Intensity range extension method for three-dimensional shape measurement in phase-measuring profilometry using a digital micromirror device camera," Applied Optics, Oct. 2008, vol. 47, No. 29 5400-5407 (8 pages).
Takeda, M. et al., "Fourier transform profilometry for the automatic measurement of 3-d object shapes," Applied Optics, Dec. 1983, vol. 22, No. 24, 3977-3982 (6 pages).
Schreiber, H. et al., "Optical Shop Testing," Third Edition, 2007, "Chapter 14. Phase Shifting Interferometry," pp. 547-666, John Wiley & Sons, Inc.(141 pages).
Su, X. et al., "Reliability-guided phase unwrapping algorithm: a review," Optics and Lasers in Engineering, 2004, vol. 42, 245-261 (17 pages).
Zhang, S., "Absolute phase retrieval methods for digital fringe projection profilometry: a review," Optics and Lasers in Engineering, Mar. 2018, vol. 107, 28-37 (10 pages).
Li, B. et al., "Novel calibration method for structured light system with an out-of-focus projector," Applied Optics, Jun. 2014, vol. 53, No. 16, 3415-3426 (12 pages).
Zhang, S., "Flexible 3d shape measurement using projector defocusing: Extended measurement range," Optical Letters, Apr. 2010, vol. 35, No. 7, 934-936 (3 pages).
Xu, Y. et al., "Phase error compensation for three-dimensional shape measurement with projector defocusing," Applied Optics, Jun. 2011, vol. 50, No. 17, 2572-2581 (10 pages).
Hyun, J.-S. et al., "Enhanced two-frequency phase-shifting method," Applied Optics, Jun. 2016, vol. 55, No. 16, 4395-4401 (7 pages).
Liao, P.-S. et al., "A fast algorithm for multilevel thresholding," Journal of Information Science and Engineering, 2001, vol. 17, 713-727 (15 pages).
Tsai, D.-M. et al., "A fast histogram-clustering approach for multilevel thresholding," Pattern Recognition Letters, Apr. 1992, vol. 13, 245-252 (8 pages).
Otsu, N., "A threshold selection method from gray-level histogram," IEEE Transactions on Systems, Man, and Cybernetics, Jan. 1979, vol. smc-9, No. 1, 62-66 (5 pages).
Chen, C. et al., "Adaptive projection intensity adjustment for avoiding saturation in three-dimensional shape measurement," Optical Communications, Nov. 2017, vol. 410, pp. 694-702 (9 pages).

\* cited by examiner

METHOD AND SYSTEM FOR AUTOMATIC EXPOSURE DETERMINATION FOR HIGH-RESOLUTION STRUCTURED LIGHT 3D IMAGING

This application claims the benefit of priority of U.S. provisional application Ser. No. 62/853,553, filed on May 28, 2019 the disclosure of which is herein incorporated by reference in its entirety.

GOVERNMENT LICENSE RIGHTS

This invention was made with government support under contract numbers 2016-DN-BX-0189 awarded by the National Institute of Justice. The government has certain rights in the invention.

FIELD

The method and system disclosed in this document relate to three-dimensional imaging and, more particularly, to automatic exposure determination for high-resolution structured light three-dimensional imaging.

BACKGROUND

Unless otherwise indicated herein, the materials described in this section are not prior art to the claims in this application and are not admitted to the prior art by inclusion in this section.

High-resolution and high-speed three-dimensional (3D) shape measurement based on various digital fringe projection (DFP) methods have been substantially advanced and extensively employed in various applications. However, it is difficult for a non-expert to consistently acquire high-quality data using a DFP system due to the lack of automation.

Automatically adjusting the camera exposure based on the scene within the field of view has been extensively used in two-dimensional (2D) imaging. Yet, the level of automation for advanced 3D shape measurement based on DFP techniques is far lower than that of its 2D counterparts because the involvement of a projection device. It is easy to understand that it is equally critical for DFP techniques to achieve similar level of automation to broaden its field of use and increase its impact. However, one key issue that has not been adequately studied in the literature is how to determine the desired optimal exposure(s) rapidly without human intervention. Accordingly, improvements in the determination of optimal exposure times for DFP techniques would be advantageous.

SUMMARY

A method for measuring a three-dimensional profile of an object is disclosed. The method comprises projecting, with a projector, structured light onto an object to generate fringe patterns on a surface of the object. The method further comprises capturing, with a camera, a first image of the surface of the object with a first exposure time, the first image including the fringe patterns on the surface of the object. The method further comprises determining, with a processor, a second exposure time based on the first image. The method further comprises capturing, with the camera, at least one second image of the surface of the object with the second exposure time, the at least one second image including the fringe patterns on the surface of the object. The method further comprises determining, with the processor, a three-dimensional profile of the surface of the object based on the fringe patterns captured in the at least one second image.

A system for measuring a three-dimensional profile of an object is disclosed. The system comprises a projector configured to project structured light onto an object to generate fringe patterns on a surface of the object. The system further comprises a camera configured to capture images of the surface of the object, the images including the fringe patterns on the surface of the object. The system further comprises a processor operably connected to the projector and the camera. The processor is configured to operate the camera to capture a first image of the surface of the object with a first exposure time. The processor is further configured to determine a second exposure time based on the first image. The processor is further configured to operate the camera to capture at least one second image of the surface of the object with the second exposure time. The processor is further configured to determine a three-dimensional profile of the surface of the object based on the fringe patterns captured in the at least one second image.

A non-transitory computer-readable medium for measuring a three-dimensional profile of an object is disclosed. The computer-readable medium stores program instructions that, when executed by a processor, cause the processor to: operate a projector to project structured light onto an object to generate fringe patterns on a surface of the object; operate a camera to capture a first image of the surface of the object with a first exposure time, the first image including the fringe patterns on the surface of the object; determine a second exposure time based on the first image; operate the camera to capture at least one second image of the surface of the object with the second exposure time, the at least one second image including the fringe patterns on the surface of the object; and determine a three-dimensional profile of the surface of the object based on the fringe patterns captured in the at least one second image.

BRIEF DESCRIPTION OF THE DRAWINGS

The foregoing aspects and other features of the method and system are explained in the following description, taken in connection with the accompanying drawings.

DETAILED DESCRIPTION

Figure 1:
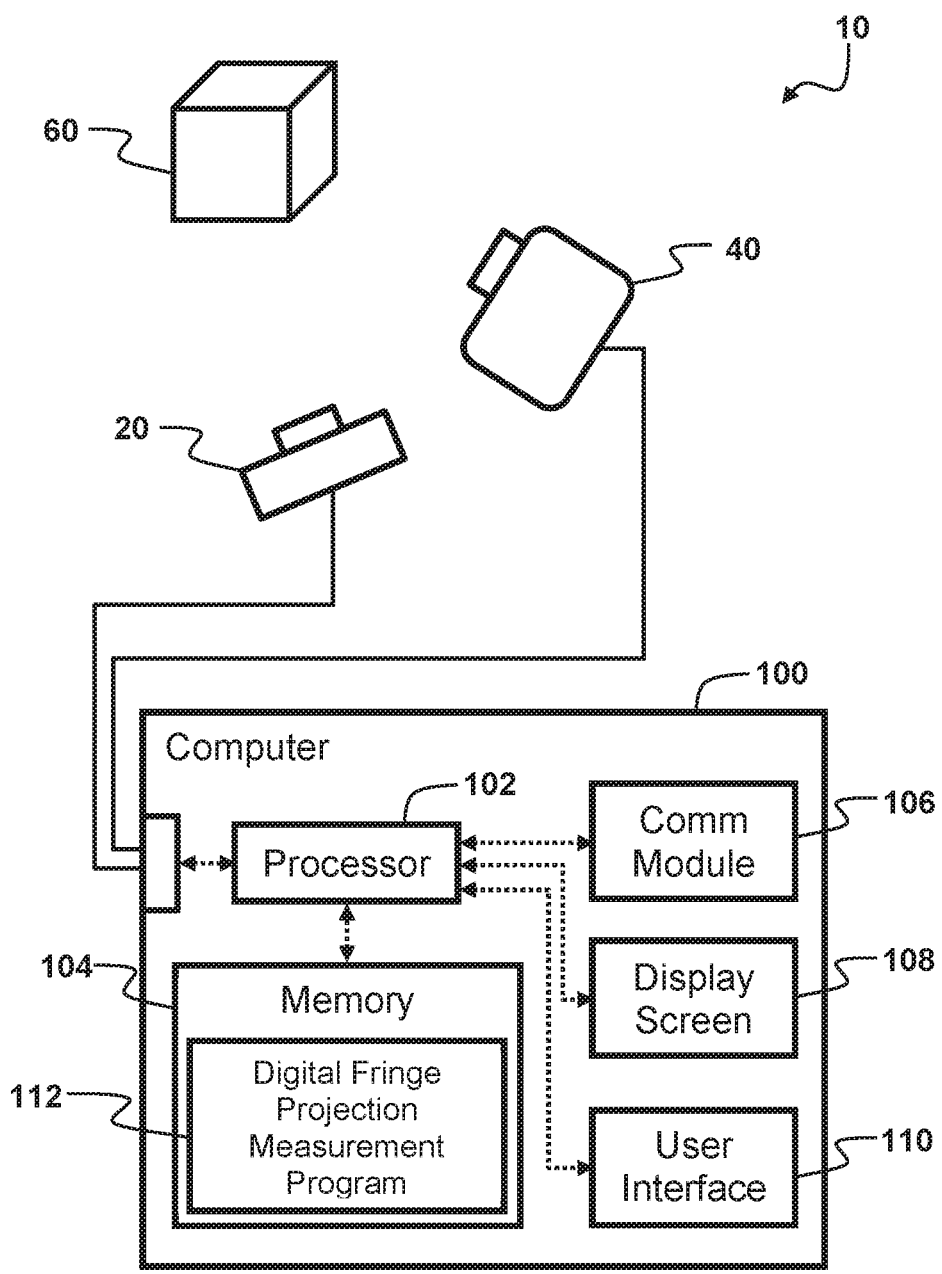
FIG. 1 shows a block diagram of an exemplary embodiment of a digital fringe projection system.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Introduction to Digital Fringe Projection

The disclosure provides an improvement to digital fringe projection techniques in which an optimal exposure time for capturing images is determined automatically. It will be appreciated by those of ordinary skill in these arts that digital fringe projection (DFP), which may also be referred to as digital fringe pattern profilometry, is a non-contact profilometry technique used to measure a 3D profile of a target surface. In particular, DFP is an active technique in which a projector is utilized to project structured light onto a target object to generate fringe patterns on the surface of the target object. A camera is utilized to capture the images of the fringe patterns on the surface of the target object. The structured light is periodic so as to generate essentially periodic fringe patterns on the target surface. Due to the 3D profile of the surface of the target object, the fringe patterns captured by the camera are slightly shifted and/or distorted. The 3D profile of the surface of the target object can be calculated based these shifts in the captured fringe pattern. As used herein, the term "three-dimensional profile" or "3D profile" refers to any type of geometric information describing the surface to be measured and may take to form of, for example, a plurality of distance or height values, each associated with individual pixels in the images of the surface, or a plurality of points in a point cloud, each having three-dimensional coordinates in some reference coordinate system.

It will further be appreciated by those of ordinary skill in these arts that there are a wide variety of DFP techniques which utilize different forms of structured light and resulting fringe patterns, as well as different algorithms for calculating the 3D profile of the surface of the target object based on images that capture the resulting fringe patterns.

The structured light can be configured so as to generate a variety of different fringe patterns including, sinusoidal fringe patterns, triangular fringe patterns, and various coded fringe patterns. Often, a fringe pattern appears as an alternating series of bars of light and dark, or as a grid of light and dark. However, other fringe patterns can be utilized. As used herein, the phrase "structured light" refers to any projected light that has predetermined structures so as to generate a pattern of light with predetermined structures on a surface. As used herein, the term "fringe pattern" refers to any pattern of light generated on a surface by structured light.

Likewise, there are a wide variety of algorithms used to extract the 3D profile of the surface of the target object. As one particular example, we describe a three-step phase shifting algorithm for extracting geometric information from sinusoidal fringe patterns generated on a target surface. Mathematically, a k-th sinusoidal fringe pattern can be described as $$I_k(x,y)=A(x,y)+B(x,y)\cos[\phi(x,y)+\delta_k] \quad (1),$$

where $A(x, y)$ is the average intensity, $B(x, y)$ is the intensity modulation, $\phi(x, y)$ is the phase to be solved for, and $\delta_k$ is the phase shift. The variation of fringe analysis techniques lies in the way of recovering phase $\phi(x, y)$ from the fringe pattern and subsequently reconstruct 3D from $\phi(x, y)$. For example, the phase $\phi(x, y)$ can be retrieved from one single pattern using a Fourier transform method or from multiple patterns using a phase-shifting algorithm, along with other alternative methods.

In a three-step phase-shifting algorithm, the phase $\phi(x, y)$ with an equal phase shift of $2\pi/3$, i.e., $\delta_k=2\pi(k-1)/3$, can be recovered as $$\phi(x, y) = \tan^{-1}\left\{\frac{\sqrt{3}\,[I_1(x, y) - I_3(x, y)]}{2I_2(x, y) - I_1(x, y) - I_3(x, y)}\right\}, \quad (2)$$

where $\phi(x, y)$ is the wrapped phase with $2\pi$ discontinuities. A spatial or temporal phase unwrapping can be used to obtain a smooth phase by removing those $2\pi$ discontinuities. The unwrapped phase can then be converted to 3D shape after system calibration.

The same set of three equations can also generate the surface texture illuminated by the average projected and ambient light $$T(x,y)=A(x,y)+B(x,y) \quad (3).$$

Automatic Exposure Determination for Digital Fringe Projection

As noted above, the disclosure provides a method for rapidly and automatically determining optimal exposure times for measuring three-dimensional (3D) profiles using digital fringe projection. Since a DFP system includes both a projector and a camera, there are essentially five parameters that can be adjusted to change captured 3D image: 1) projector aperture; 2) projected light intensity; 3) camera aperture; 4) camera gain; and 5) camera exposure time. In general, adjusting these parameters can be classified into two categories: parameters that require physically manipulation to adjust (e.g., projector aperture and camera aperture), and parameters that can be adjusted without physical manipulation. Physical manipulation of the camera configuration is generally undesirable because the system must be re-calibrated afterward. For example, one method for adjusting camera exposure time for high-quality fringe pattern acquisition is to manually adjust the lens aperture of one of the lenses of the camera. However, such manual adjustments involve physical manipulation and, thus, can introduce relative movement between system components that is not desirable, which will require the system to be re-calibrated. Accordingly, electronically adjusting camera exposure time without physical manipulation of the system is advantageous for high-accuracy 3D shape measurement.

Given an arbitrary target object with an unknown surface reflectivity and lighting conditions, it is difficult to rapidly determine the optimal exposure time for high-quality 3D shape measurement because the procedures are very complicated. Particularly, in a DFP system, the image captured by the camera is affected by: 1) the ambient light directly entering camera sensor; 2) the ambient light reflected/scattered by the target object; 3) the projected light reflected by the target object; and 4) the noise of image sensors of the camera. Thus, determination of an optimal single exposure time requires an understanding of the reflectivity characteristics of the target object.

The method disclosed herein advantageously utilizes only a single captured image of the target object to understand the surface properties of the target object and determine a single global optimal exposure time for capturing a 3D image of the target object. The method leverages the fact that, if the image sensor of the camera responds properly, the intensity of the image acquired by the camera is approximately linearly related to the camera exposure time. Based on this fact, a single global optimal exposure time can be rapidly and automatically determined by analyzing a texture image (a photograph) acquired by the camera of the target object. The single global optimal exposure time is determined based on only a single image with "proper" exposure. Here, "proper" means that the overall image does not fall within the "dead" region (i.e., camera is saturated).

In summary, the method includes a pre-calibration step in which the camera's responses to objects of different reflectivity are determined, the response function is estimated, and an intrinsic constant value for the camera response is determined. Once the intrinsic constant value is determined, a single global optimal exposure time is determined by capturing a single image with a single exposure for a target object. Additionally, further optimal exposure times for high dynamic range (HDR) image capture can also be determined by capturing image(s) with the single global optimal exposure time.

Determination of a Single Global Optimal Exposure Time

Given an arbitrary object with unknown surface reflectivity, it is very difficult to determine the optimal exposure time. Therefore, the first step of this framework requires an understanding of how the image of the object forms on the camera sensor. As discussed before, the following factors influence the image formed on a camera sensor: 1) the ambient light coming directly to the camera sensor with an intensity of $L^a$; 2) the ambient light with an intensity of $L^o$ reflected by the object with surface reflectivity of $\rho$, $\rho L^o$; 3) the projected light with an intensity of $L^p$ reflected by the object, $\rho L^p$; and 4) the noise of the sensors $I^n$. Assuming the camera sensitivity is $\alpha$ and the exposure time is t, the camera image can then be described as $$I(x,y;t) = \alpha[L^a + \rho L^o + \rho L^p] \times t + I^n \quad (4).$$

If the projected light is much stronger than the ambient light, one can assume that $L^a$ and $L^o$ are negligible in comparison to $L^p$. We can also assume that $\alpha$ and $\rho$ are constants for a given pixel and that the projector's light is approximately constant over time, such that $L^p$ is a constant for each pixel. Thus, equation (4) can be simplified as $$I(x,y;t) = \alpha \rho L^p \times t + I^n = k(x,y) \times t + c(x,y) \quad (5).$$

For a stationary target object, k(x, y) can be determined by capturing a set of images of the target object with different exposure times and analyzing the intensities of each pixel with linear regression. Since $\alpha$ and $L^p$ are known, k(x, y) can be used to determine an approximate surface reflectivity $\rho(x, y)$ for the target object at each imaged pixel.

Once the surface reflectivity $\rho(x, y)$ at each imaged pixel is known, the optimum exposure time for each pixel t(x, y) can be mathematically calculated. To achieve the optimal performance, one could capture images with optimal exposure time for each individual pixel and blend the images together to yield data of the best quality for 3D computations. However, such a process would be extremely slow because it generally would require the acquisition of images using many different exposure times.

In practice, a single global optimal exposure time for the whole image is desirable to speed up the measurement procedures. Ideally, the single global optimal exposure time should result in an image in which the target object's high-reflectivity regions come as close to saturated as possible without actually becoming saturated. Thus, measured reflectivity values $\rho(x, y)$ of the target object can be sorted from greatest to least as $\rho_1 \geq \rho_2 \geq \cdots \geq \rho_{n-1} \geq \rho_n$, where n is the total number of reflectivity values belonging to the target object. Since the measured reflectivity values $\rho(x, y)$ are linearly related to measured intensity values I(x, y), these can equivalently by sorted from greatest to least as least as $I_1 \geq I_2 \geq \cdots \geq I_{n-1} \geq I_n$. In either case, an index m from this ordered set can be selected according to the criteria $$m = \text{Round}(n \times P) \quad (6),$$

where P is a chosen acceptable percentage of pixels that may be beyond a target maximum pixel intensity value, and is generally chosen as a low percentage (e.g., 2%)

A target or desired maximum pixel intensity value for the final image, $I_{max}$, can be determined by inserting reflectivity value at the selected index, $\rho_m$, into equation (5). This yields $$I_{max} = \alpha \rho_m L^p \times t + c_m \quad (7).$$

Here $c_m$ is the intercept value from the linear regression solution for the pixel with reflectivity $\rho_m$. If $c_m \ll I_{max}$ assuming that the effect of $c_m$ is negligible. Therefore, optimal exposure time t can be determined by $$t = \frac{I_{max}}{\alpha \rho_m L^p} = \frac{I_{max}}{k_m}. \quad (8)$$

The predicted optimal exposure time t, together with known $\alpha$ and $L^p$, yields an image with approximately the upper P percentage of subject pixels having intensities $I \geq I_{max}$. When $I_{max}$ is set to the saturation point of the camera sensor and P is chosen small enough to prevent data loss from saturation, equation (8) yields an optimal exposure time for 3D measurement.

According to equation (8), if $k_m$ is known, the optimal exposure time t can be automatically determined assuming that $c_m$ is very small. As discussed above, the single global optimal exposure time is actually determined based on a single point response of the camera, and thus the problem can be further simplified for a more general case in which $c_m(x,y)$ is not negligible. Referring back to equation (5), for a given point $(x_0, y_0)$, if $c(x_0, y_0)$ remains relatively constant, i.e., $c(x_0, y_0) \approx c_0$, then $c(x_0, y_0)$ can be pre-calibrated, even though it may not be small for different $\rho$. With a pre-calibrated value for $c_0$, $k(x_0, y_0)$ can be determined using a single image with a known exposure time $t_0$ according to $$k_m(x_0, y_0) = \frac{I_m(t_0) - c_0}{t_0}. \quad (9)$$

Thus, with a pre-calibrated value for $c_0$ and a single image with a known exposure time $t_0$, the single global optimal exposure time $t^o$ can be determined according to $$t^o = s \times t_0 = \frac{I_{max} - c_0}{I_m(t_0) - c_0} \times t_0. \quad (10)$$

Moreover, it has been found that $c(x_0, y_0)$ remains relatively constant for target objects having different reflectivity, such that $c_0$ can be approximately treated as a constant that is independent of target object being measured. As a result, the calibration process can be significantly simplified and the optimal exposure time determination process can be sped up. In other words, after a pre-calibration for the particular camera configuration, the single global optimal exposure time $t^o$ for any target object can be determined based on a single image captured with a known exposure time $t_0$.

Determination of Further Optimal Exposure Times for HDR Image Capture

The automatic determination of optimal exposure time can be extended to determine further optimal exposure times for high dynamic range (HDR) image capture. It will be appreciated that, HDR image capture involves the capture of multiple images using different exposure times, which are subsequently combined to form a HDR image that is properly exposed at most or all points.

Since $c_0$ is a constant value for a given camera configuration (e.g., fixed lens, and sensor gain), it is also possible to automatically determine the number of exposures and the corresponding optimal exposure times $t_{HDR}$ required to achieve HDR. First, we capture an image with the single global optimal exposure time $t^o$ determined using the process described above, using equation (10) in particular. Next, we analyze the image to determine the number of exposure times required to achieved desired quality.

To quickly achieve this, we compute the probability density function, $f(x)$, of the image (i.e., the percentage of points with a given grayscale value). Next, we compute the probability accumulation function $$P(k) = \int_0^k f(x)dx \qquad (11),$$

where $k \in [0, 255]$ for an 8-bit camera image.

We then determine the acceptable lower bound of the image intensity for high-quality 3D shape measurement, $I_{min}$. The first optimal exposure time for the HDR image capture is $t_{HDR}^0 = t^o$ is that which was previously determined using equation (10). A scaling factor $s^1$ is determined according to $$s^1 = \frac{I_{max} - c_0}{I_{min} - c_0}, \qquad (12)$$

and a second exposure time $t_{HDR}^1$ can be determined by $$t_{HDR}^1 = s^1 \times t^o \qquad (13).$$

If $P(I_{min})$ is smaller than a given threshold (i.e., most pixels are well captured already), or $t_{HDR}^1$ is already the maximum preferable exposure time, no additional exposure is necessary. If another exposure is necessary, the exposure time can be determined in a similar manner. Again, assume the lower bound of the image with exposure time $t_{HDR}^1$ is $I_{min}^1$. First, we determine the corresponding grayscale value $I_{min}^1$ with exposure time $t^o$ according to $$s^1 = \frac{I_{max} - c_0}{I_{min} - c_0} = I\frac{I_{min}^1 - c_0}{I_{min}^1 - c_0}, \qquad (14)$$

$$I_{min}^1 = \frac{I_{min} - c_0}{s^1} + c_0. \qquad (15)$$

The next exposure time will ensure that $I_{min}^1 = I_{max}$, and thus the scaling factor $s^2$ is determined by $$s^2 = \frac{I_{max} - c_0}{I_{min}^1 - c_0}, \qquad (16)$$

and a further exposure time $t_{HDR}^2$ is predicted as $$t_{HDR}^2 = s^2 \times t^o, \qquad (17).$$

Following similar procedures, one can determine other exposure times to ensure the entire image is properly exposed.

As can be seen here, the proposed HDR algorithm is recursive and the measurement quality for the entire scene is adapted based on the choice of $I_{max}$, and $I_{min}$. Particularly, the smaller the difference between $I_{max}$, and $I_{min}$, the better the measurement quality. In addition, in some embodiments, instead of using a single image for such an analysis, one can analyze the acquired image with exposure time $t_{HDR}^k$ to determine to next exposure time for higher accuracy. However, if the primary interest is to quickly determine all necessary exposure times, we only have to analyze the image with a single exposure.

Digital Fringe Projection Measurement System

FIG. 1 shows a block diagram of an exemplary embodiment of a digital fringe projection system 10. The digital fringe projection system 10 comprises a camera 20, a projector 40, and a computer 100. The computer 100 operates the camera 20 and the projector 40 to capture a three-dimensional image of a target object 60. The computer 100 is advantageously configured to automatically determine a single global optimal exposure $t^o$ time for high-quality 3D shape measurement using digital fringe projection techniques. The computer 100 rapidly and automatically determines the single global optimal exposure $t^o$ by analyzing a single image of the target object 60 captured with a known exposure time $t_0$. Additionally, if an HDR image is to be captured, the computer 100 rapidly and automatically determines further optimal exposure times $t_{HDR}$ for HDR image capture using an image of the target object 60 captured with the single global optimal exposure $t^o$.

The camera 20 generally comprises an image sensor (not shown) configured to capture images of the target object 60. Moreover, the camera 20 generally comprises a lens (not shown), which may or may not be adjustable. In one embodiment, the camera 20 is a complementary metal-oxide-semiconductor (CMOS) camera, e.g., a PointGrey Grasshopper3 GS3-U3-23S6M, having a 25 mm lens, e.g., Computar M0814-MP2. The raw images each comprise a two-dimensional array of pixels (e.g., 1920×1200 pixels). Each pixel (x, y) has corresponding photometric information, which at least includes an intensity I(x, y), but which may further include multi-channel intensity and/or color information.

The projector 40 is configured to projected structured light onto the target object 60 to generate fringe patterns on the surface of the target object 60. The projector 40 generally is in the form of a digital light processing (DLP) projector, e.g., LightCrafter 4500, but may take other forms. As described above, the structured light can be configured so as to generate a variety of different fringe patterns including, sinusoidal fringe patterns, triangular fringe patterns, and various coded fringe patterns. The projector 40 projects the structured light with a particular resolution (e.g., 912×1140 pixels) and a particular frequency (e.g. 60 Hz), both of which may or may not be adjustable.

In the illustrated exemplary embodiment, the computer 100 comprises at least one processor 102, at least one memory 104, a communication module 106, a display screen 108, and a user interface 110. However, it will be appreciated that the components of the computer 100 shown and described are merely exemplary and that the computer 100 may comprise any alternative configuration. Particularly, the computer 100 may comprise any computing device such as a desktop computer, a laptop, a smart phone, a tablet, or another personal electronic device. Thus, the computer 100 may comprise any hardware components conventionally included in such computing devices.

The memory 104 is configured to store data and program instructions that, when executed by the at least one processor 102, enable the computer 100 to perform various operations described herein. The memory 104 may be of any type of device capable of storing information accessible by the at least one processor 102, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. Thus, the at least one processor 102 may include a central processing unit, graphics processing units, multiple processing units, dedicated circuitry for achieving functionality, programmable logic, or other processing systems. Additionally, it will be appreciated that, although the computer 100 is illustrated as single device, the computer 100 may comprise several distinct processing systems 40 that work in concert to achieve the functionality described herein.

The communication module 106 may comprise one or more transceivers, modems, processors, memories, oscillators, antennas, or other hardware conventionally included in a communications module to enable communications with various other devices, such as the drone 30. In at least some embodiments, the communication module 106 includes a Wi-Fi module configured to enable communication with a Wi-Fi network and/or Wi-Fi router (not shown). In further embodiments, the communications modules 46 may further include a Bluetooth® module, an Ethernet adapter and communications devices configured to communicate with wireless telephony networks.

The display screen 108 may comprise any of various known types of displays, such as LCD or OLED screens. In some embodiments, the display screen 108 may comprise a touch screen configured to receive touch inputs from a user. The user interface 110 may suitably include a variety of devices configured to enable local operation of the computer 100 by a user, such as a mouse, trackpad, or other pointing device, a keyboard or other keypad, speakers, and a microphone, as will be recognized by those of ordinary skill in the art. Alternatively, in some embodiments, a user may operate the computer 100 remotely from another computing device which is in communication therewith via the communication module 106 and has an analogous user interface.

The program instructions stored on the memory 104 include a digital fringe projection measurement program 112. As discussed in further detail below, the processor 102 is configured to execute the digital fringe projection measurement program 112 to operate the camera 20 to capture images of the target object 60 with optimal exposure and to process those images to determine a 3D profile of the target object 60 using DFP techniques.

Method for Operating the Digital Fringe Projection Measurement System

Figure 2:
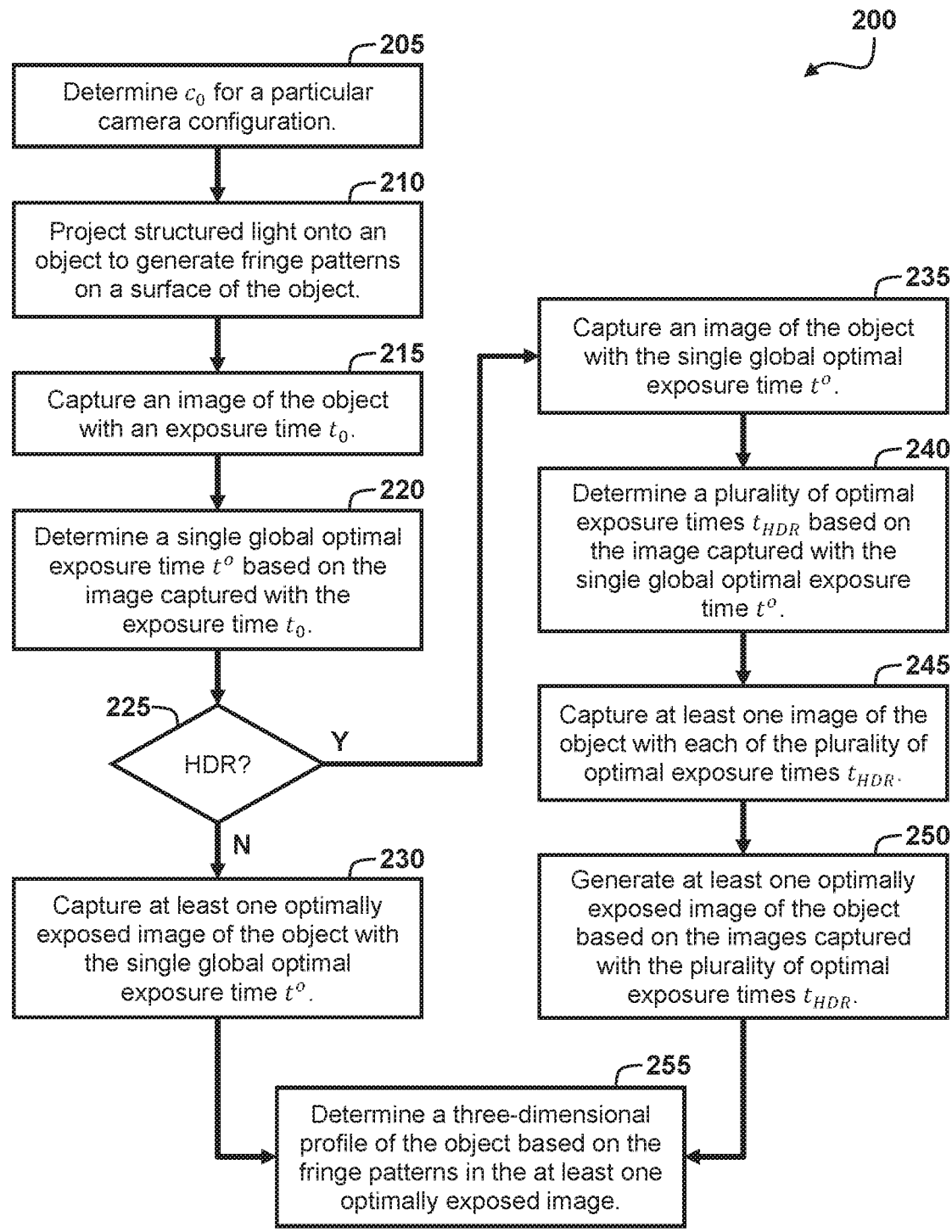
FIG. 2 shows a flow diagram for a method for operating the digital fringe projection measurement system.

FIG. 2 shows a flow diagram for a method 200 for operating the digital fringe projection measurement system 10. In the description of these method, statements that some task, calculation, or function is performed refers to a processor (e.g., the processor 102 of the computer 100) executing programmed instructions stored in non-transitory computer readable storage media (e.g., the memory 104 of the computer 100) operatively connected to the processor to manipulate data or to operate one or more components of the computer 100 to perform the task or function. Additionally, the steps of the methods may be performed in any feasible chronological order, regardless of the order shown in the figures or the order in which the steps are described.

The method 200 begins with a step of determining $c_0$ for a particular camera configuration (block 205). Particularly, the processor 102 is configured to execute the digital fringe projection measurement program 112 to determine a value $c_0$, which represents the lowest intensity value to which the camera 20 will respond or measure, given its particular configuration. As used herein with respect to a camera, the term "configuration" refers to a particular set of components, adjustments, or settings of the camera that influence its optical intensity response characteristics including, but not limited to, image sensor gain, image sensor gamma, image sensor type, and the physical image sensor itself (which may have response variances compared other image sensors of ostensibly the same type and model). It will be appreciated the value $c_0$ relates closely to the noise $I''$ of the camera 20. In other words, an image sensor with a larger noise $I''$ will have a larger value for $c_0$ and an image sensor with a smaller noise $I''$ will have a smaller value for $c_0$.

Figure 3:
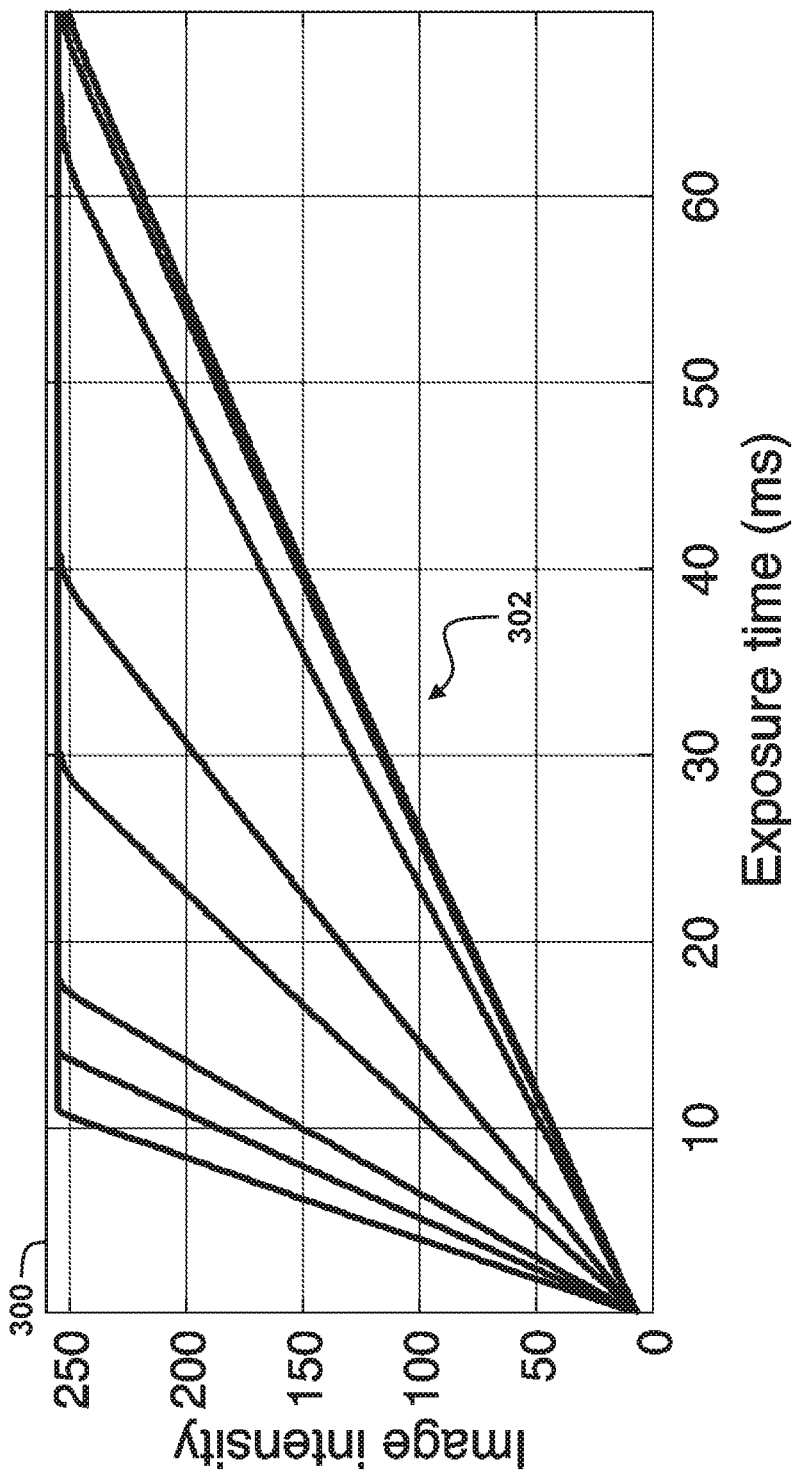
FIG. 3 shows a plot including of several response curves of an 8-bit camera.

In at least one embodiment, a value $c_0$ is determined by the processor 102 during a pre-calibration process, which occurs prior to capturing images of the object 60 that is to be profiled. The processor 102 determines the value $c_0$ experimentally based on one or more images captured by the camera 20, such as images of various test patterns or test objects have varying levels of reflectivity. As an example, FIG. 3 shows a plot 300 including of several response curves 302 of an 8-bit camera, which outputs intensity values ranging from 0 to 255. Each curve 302 corresponds to a different test pattern or test object having a different reflectivity $\rho$. As can be seen, regardless of the particular reflectivity $\rho$ of the subject, the measured intensity (vertical axis) by the image sensor is linearly related to exposure time (horizontal axis) and also has a common vertical intercept. The value $c_0$ corresponds to this common vertical intercept of the response curves 302.

The method 200 continues with a step of projecting structured light onto an object to generate fringe patterns on a surface of the object (block 210). Particularly, the processor 102 is configured to execute the digital fringe projection measurement program 112 to operate the projector 40 to project structured light onto an object to generate fringe patterns on a surface of the object. As discussed above, the structured light can be configured so as to generate a variety of different fringe patterns including, sinusoidal fringe patterns, triangular fringe patterns, and various coded fringe patterns.

The method 200 continues with a step of capturing an image of the object with an exposure time $t_0$ (block 215). Particularly, the processor 102 is configured to execute the digital fringe projection measurement program 112 to operate the camera 20 to capture an image of the object 60 with an exposure time $t_0$, the image including the fringe patterns on the surface of the object 60. The exposure time $t_0$ is a predetermined default value, which may be a default value for the camera 20 or selected in some other manner. Generally, the exposure time $t_0$ is selected within some range of typical exposure times (i.e. not extremely small or extremely large) and will depend on the camera 20.

The method 200 continues with a step of determining a single global optimal exposure time $t^o$ based on the image captured with the exposure time $t_0$ (block 220). Particularly, the processor 102 is configured to execute the digital fringe projection measurement program 112 to determine a single global optimal exposure time $t^o$ based on the image captured with the exposure time $t_0$. In some embodiments, the single global optimal exposure time $t^o$ is determined such that, in an image captured with the single global optimal exposure time $t^o$, high-reflectivity regions of the object 60 come as close to saturation as possible without actually becoming saturated. In some embodiments, the single global optimal exposure time $t^o$ is determined such that, in an image captured with the single global optimal exposure time $t^o$, less than a threshold percentage or threshold number of pixels corresponding to the object 60 become saturated.

In some embodiments, the processor 102 determines a scaling factor s based on the image captured with the exposure time $t_0$ and determines the single global optimal exposure time $t^o$ based on the scaling factor s and the exposure time $t_0$, i.e. $t^o = s \times t_0$ or equivalent. Particularly, in some embodiments, the processor 102 determines the scaling factor s based on (i) the value $c_0$, (ii) a target maximum intensity value $I_{max}$, and (iii) a measured intensity value $I_m(t_0)$ from a selected pixel m in the image captured with the exposure time $t_0$.

In some embodiments, the processor 102 calculates the scaling factor s according to equation (10) as a ratio of (i) a difference between the target maximum intensity value $I_{max}$ and the value $c_0$ and (ii) a difference between the measured intensity value $I_m(t_0)$ and the value $c_0$, i.e. in the form $$s = \frac{I_{max} - c_0}{I_m(t_0) - c_0}$$

or equivalent.

It should be appreciated that this target maximum intensity value $I_{max}$ corresponds to the desired maximum intensity value for the optimally exposed final images that will be used to determine the three-dimensional profile of the object 60. In at least some embodiments, the processor 102 selects or sets the maximum desired intensity value $I_{max}$ based on a user input received via the user interface 110. Alternatively, in some embodiments, the processor 102 selects or sets the maximum desired intensity value $I_{max}$ automatically based a saturation point of the camera 20. In one embodiment, either by user input or automatically, the desired maximum intensity value $I_{max}$ is set equal to the saturation point of the camera 20. For example, for an 8-bit camera, which outputs intensity values ranging from 0 to 255, for maximum intensity value $I_{max}$ value of 255 might be selected. In another embodiment, either by user input or automatically, the desired maximum intensity value $I_{max}$ is set equal to a value that is a predetermined Nicoleamount or percentage less than the saturation point. For example, for an 8-bit camera, which outputs intensity values ranging from 0 to 255, for maximum intensity value $I_{max}$ value of 250 might be selected. This is advantageous if the camera 20 has nonlinearities in its response at intensities near, but not quite at, the saturation point.

It should also be appreciated that the selected pixel m in the image captured with the exposure time $t_0$ corresponds to a pixel which is desired to have the target maximum intensity value $I_{max}$ in the optimally exposed final images that will be used to determine the three-dimensional profile of the object 60. In at least one embodiment, the pixel m is selected such that, in an image captured with the single global optimal exposure time $t^o$, less than a threshold percentage P (or equivalent threshold number) of pixels corresponding to the object 60 will have measured intensities I that are greater than the target maximum intensity value $I_{max}$. Since measured intensities I increase and decrease linearly with respect to exposure time, the pixel m can be equivalently selected such that, in the image already captured with the exposure time $t_0$, less than the threshold percentage P of pixels corresponding to the object 60 have measured intensities I that are greater than a measured intensity $I_m$ of the selected pixel m.

To this end, in at least one embodiment, the processor 102 identifies a subset of n pixels in the image already captured with the exposure time $t_0$ corresponding to the object 60. Next, the processor 102 sorts the measured intensity values I(x, y) of the subset of n pixels greatest to least and assigns each of the measured intensity values I(x, y) an integer index 1, . . . , n according to the sorting, resulting in sorted measured intensity values $I_1 \geq I_2 \geq \cdots \geq I_{n-1} \geq I_n$. In an alternative embodiment, the measured intensity values are instead sorted from least to greatest. Next, the processor 102 selects an index $m \in [0, n]$ such that less than the predetermined percentage P of all other sorted measured intensities are greater than the measured intensity $I_m$ of the selected index m. In one embodiment, the processor 102 selects the index m by multiplying the predetermined percentage P (or 1−P) by the total number of pixels of the subset of n pixels and rounding to a nearest integer, i.e. m=Round(n×P) or m=Round(n×(1−P)), depending on the sorting direction of the measured intensity values. Finally, the processor 102 selects the pixel m from the subset of n pixels that corresponds to the measured intensity value $I_m$ with the selected index m.

If HDR is not enabled (block 225), the method 200 continues with a step of capturing at least one optimally exposed image of the object with the single global optimal exposure time $t^o$ (block 230). Particularly, the processor 102 is configured to execute the digital fringe projection measurement program 112 to operate the camera 20 to capture at least one optimally exposed image of object 60 with the single global optimal exposure time $t^o$, each image including the fringe patterns on the surface of the object 60. As will discussed below, when HDR is not enabled, the at least one optimally exposed image of object 60 captured in this step with the single global optimal exposure time $t^o$ are the images that will be used to extract a three-dimensional profile of the object 60 using DFP techniques.

If HDR is enabled (block 225), the method 200 continues with a step of capturing an image of the object with the single global optimal exposure time $t^o$ (block 235). Particularly, the processor 102 is configured to execute the digital fringe projection measurement program 112 to operate the camera 20 to capture a single image of object 60 with the single global optimal exposure time $t^o$, the image including the fringe patterns on the surface of the object 60.

The method 200 continues with a step of determining a plurality of optimal exposure times $t_{HDR}$ based on the image captured with the single global optimal exposure time $t^o$ (block 240). Particularly, the processor 102 is configured to execute the digital fringe projection measurement program 112 to determining a plurality of optimal exposure times $t_{HDR}$ based on the single image of object 60 captured with the single global optimal exposure time $t^o$. In some embodiments, a first of the optimal exposure times $t_{HDR}^0$ is set equal to the single global optimal exposure time $t^o$ and the processor 102 determines additional optimal exposure times $t_{HDR}^1, t_{HDR}^2, t_{HDR}^3$, etc. based on the first of the optimal exposure times $t_{HDR}^0$ and the single image of object 60 captured with the single global optimal exposure time $t^o$. Generally, the first of the optimal exposure times $t_{HDR}^0$ is the shortest exposure time and each additional optimal exposure time $t_{HDR}^1, t_{HDR}^2, t_{HDR}^3$, etc. is increasingly longer.

In some embodiments, the processor 102 determines the additional optimal exposure time $t_{HDR}^1, t_{HDR}^2, t_{HDR}^3$, etc. using a recursive or iterative process. Particularly, the processor 102 selects an initial minimum intensity value $I_{min}$. In at least some embodiments, the processor 102 selects or sets the initial minimum intensity value $I_{min}$ based on a user input received via the user interface 110. Alternatively, in some embodiments, the processor 102 selects or sets the initial minimum intensity value $I_{min}$ automatically based the previously set maximum intensity value $I_{max}$. The initial minimum intensity value $I_{min}$ (e.g., 200) should be set at a value that is less than the previously set maximum intensity value $I_{max}$ (e.g. 250). The difference between the previously set maximum intensity value $I_{max}$ and the selected initial minimum intensity value $I_{min}$ will influence the total number of additional optimal exposure time $t_{HDR}^1$, $t_{HDR}^2$, $t_{HDR}^3$, etc. that will be determined and, thus, the quality of the HDR images that will be generated.

The processor 102 determines the second optimal exposure time $t_{HDR}^1$ based on a scaling factor $s^1$ and the first optimal exposure times $t_{HDR}^0=t^o$ according to equation (13), i.e. $t_{HDR}^1=s^1 \times t^o$. The processor 102 determines the scaling factor $s^1$ based the previously set maximum intensity value $I_{max}$ and the selected initial minimum intensity value $I_{min}$. In particular, the processor 102 determines the scaling factor $s^1$ according to equation (12) as a ratio of (i) a difference between the maximum intensity value $I_{max}$ and the value $c_0$ and (ii) a difference between the initial minimum intensity value $I_{min}$ and the value $c_0$, i.e. in the form $$s^1 = \frac{I_{max} - c_0}{I_{min} - c_0}$$

or equivalent.

After determining the second optimal exposure time $T_{HDR}^1$, the processor 102 checks whether less than a threshold percentage of measured intensity values $I(x, y)$ of pixels corresponding to the object 60 in the image captured with the single global optimal exposure time $t^o$ are less than the initial minimum intensity value $I_{min}$. In particular, in one embodiment, the processor 102 the processor 102 identifies a subset of pixels in the single image of object 60 captured with the single global optimal exposure time $t^o$ corresponding to the object 60. Next, the processor 102 determines how many pixels in the subset of pixels have measured intensity values that are less than the initial minimum intensity value $I_{min}$, for example using a probability accumulation function according to equation (11), i.e. evaluating $P(I_{min})$.

If less than the threshold percentage of the pixels have measured intensity values $I(x, y)$ that are less than the initial minimum intensity value $I_{min}$, then the already determined first and second optimal exposure times $t_{HDR}^0$ and $t_{HDR}^1$ are sufficient for HDR image capture. Otherwise, if greater than the threshold percentage of the pixels have measured intensity values $I(x, y)$ that are less than the initial minimum intensity value $I_{min}$, then at least one further exposure time $t_{HDR}^2$, $t_{HDR}^3$, etc. is required.

The processor 102 determines the next exposure time $t_{HDR}^2$ based on a scaling factor $s^2$ and the first of the optimal exposure times $t_{HDR}^0=t^o$ according to equation (17), i.e. $t_{HDR}^2=s^2 \times t^0$. The processor 102 determines the scaling factor $s^2$ based the previously set maximum intensity value $I_{max}$ and a newly determined minimum intensity value $I_{min}^1$. In particular, the processor 102 determines the scaling factor $s^2$ according to equation (16) as a ratio of (i) a difference between the maximum intensity value $I_{max}$ and the value $c_0$ and (ii) a difference between the newly determined minimum intensity value $I_{min}^1$ and the value $c_0$, i.e. in the form $$s^2 = \frac{I_{max} - c_0}{I_{min}^1 - c_0}$$

or equivalent. The processor 102 determines the new minimum intensity value $I_{min}^1$ according to equation (15) based on the previous scaling factor $s^1$, the previous minimum intensity value $I_{min}$, and the value $c_0$, i.e. in the form $$I_{min}^1 = \frac{I_{min} - c_0}{s^1} + c_0$$

or equivalent. It should be appreciated that this third optimal exposure time $t_{HDR}^2$ will ensure that $I_{min}^1=I_{max}$ in an image captured therewith.

After determining the third optimal exposure time $t_{HDR}^2$, the processor 102 checks whether less than the threshold percentage of measured intensity values $I(x, y)$ of pixels corresponding to the object 60 in the image captured with the single global optimal exposure time $t^o$ are less than the newly determined minimum intensity value $I_{min}^1$, in the same manner as before. If so, then the already determined exposure times are sufficient for HDR image capture. If not, the process continues by determining a further exposure time in the same manner as the third exposure time $t_{HDR}^2$. Eventually, the newly determined minimum intensity value will be sufficiently low that less than the threshold percentage of the measured intensity values $I(x, y)$ of pixels are less than the newly determined minimum intensity value.

It should be noted that the method discussed here only represents one way of determining HDR exposure times. The proposed algorithm is biased to the overall bright area of the scene, which is preferable for many applications. However, there are alternative approaches to determine HDR exposure times based on similar principles. For example, one can determine optimal exposure times by analyzing a histogram of the measured intensities of the image using one of the well-established 2D image multilevel thresholding methods to determine optimal intensity threshold values (analogous the minimum intensity values $I_{min}$, above). Once the threshold values are determined, the corresponding exposure times can be calculated using equation (13) by replacing $I_{min}$ with each threshold value. Yet, another alternative method to find these HDR exposure times is to ensure each exposure time capture roughly the same number of points. This can be realized by determining threshold values such that there are similar number of points between two adjacent threshold selections. Once again, these threshold values are used to determine corresponding exposure times.

The method 200 continues with a step of capturing at least one image of the object with each of the plurality of optimal exposure times $t_{HDR}$ (block 245). Particularly, the processor 102 is configured to execute the digital fringe projection measurement program 112 to operate the camera 20 to capture at least one image of the object 60 using each of the plurality of optimal exposure times $t_{HDR}^0=t^o$, $t_{HDR}^1$, $t_{HDR}^2$, $t_{HDR}^3$, etc., each image including the fringe patterns on the surface of the object 60. In at least one embodiment, for each optimally exposed image to be generated, the camera 20 captures one image with each respective optimal exposure times $t_{HDR}^0$, $t_{HDR}^1$, $t_{HDR}^2$, $t_{HDR}^3$, etc.

The method 200 continues with a step of generating at least one optimally exposed image of the object based on the images captured with the plurality of optimal exposure times $t_{HDR}$ (block 250). Particularly, the processor 102 is configured to execute the digital fringe projection measurement program 112 to generate at least one optimally exposed HDR image of object 60 based on the images of the object 60 captured using each of the optimal exposure times $t_{HDR}^0$, $t_{HDR}^1$, $t_{HDR}^2$, $t_{HDR}^3$, etc. In at least one embodiment, each optimally exposed HDR image of object 60 is generated based on one image captured with each respective optimal exposure times $t_{HDR}^0, t_{HDR}^1, t_{HDR}^2, t_{HDR}^3$, etc. It will further be appreciated by those of ordinary skill in these arts that there are a wide variety of techniques, known in particular from the related two-dimensional imaging arts, for generating HDR images based on a set of images captured with different exposures.

The method 200 continues with a step of determining a three-dimensional profile of the object based on the fringe patterns in the at least one optimally exposed image (block 255). Particularly, the processor 102 is configured to execute the digital fringe projection measurement program 112 to determine a three-dimensional profile of the object based on the fringe patterns in the at least one optimally exposed image. As noted above, a wide variety of algorithms may be used to extract the 3D profile of the surface of the target object including, but not limited, to the three-step phase shifting algorithm using sinusoidal fringe patterns that was discussed above.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for measuring a three-dimensional profile of an object, the method comprising:
   projecting, with a projector, structured light onto an object to generate fringe patterns on a surface of the object;
   capturing, with a camera, a first image of the surface of the object with a first exposure time, the first image including the fringe patterns on the surface of the object;
   determining, with a processor, a first scaling factor based on (i) a lowest intensity value to which the camera will respond and (ii) the first image;
   determining a second exposure time based on the first scaling factor and the first exposure time;
   capturing, with the camera, at least one second image of the surface of the object with the second exposure time, the at least one second image including the fringe patterns on the surface of the object; and
   determining, with the processor, a three-dimensional profile of the surface of the object based on the fringe patterns captured in the at least one second image.

2. The method according to claim 1 further comprising:
   determining, with the processor, prior to capturing the first image, the lowest intensity value to which the camera will respond, based on images captured by the camera.

3. A method for measuring a three-dimensional profile of an object, the method comprising:
   projecting, with a projector, structured light onto an object to generate fringe patterns on a surface of the object;
   capturing, with a camera, a first image of the surface of the object with a first exposure time, the first image including the fringe patterns on the surface of the object;
   determining the first scaling factor based on (i) a target maximum intensity value and (ii) the first image;
   determining a second exposure time based on the first scaling factor and the first exposure time;
   capturing, with the camera, at least one second image of the surface of the object with the second exposure time, the at least one second image including the fringe patterns on the surface of the object; and
   determining, with the processor, a three-dimensional profile of the surface of the object based on the fringe patterns captured in the at least one second image.

4. The method according to claim 3, further comprising:
   receiving the target maximum intensity value from a user via a user interface.

5. The method according to claim 3, further comprising:
   automatically setting the target maximum intensity value based on a saturation point of the camera.

6. A method for measuring a three-dimensional profile of an object, the method comprising:
   projecting, with a projector, structured light onto an object to generate fringe patterns on a surface of the object;
   capturing, with a camera, a first image of the surface of the object with a first exposure time, the first image including the fringe patterns on the surface of the object;
   identifying a subset of pixels in the first image corresponding to the surface of the object;
   selecting a pixel from the subset of pixels, the selected pixel being selected such that less than a predetermined percentage of all pixels in the subset of pixels have measured intensity values greater than a measured intensity value of the selected pixel;
   determining a first scaling factor based on the measured intensity value of the selected pixel;
   determining a second exposure time based on the first scaling factor and the first exposure time;
   capturing, with the camera, at least one second image of the surface of the object with the second exposure time, the at least one second image including the fringe patterns on the surface of the object; and
   determining, with the processor, a three-dimensional profile of the surface of the object based on the fringe patterns captured in the at least one second image.

7. The method according to claim 6, the selecting the pixel comprising:
   sorting the measured intensity values of the subset of pixels;
   assigning each of the measured intensity values of the subset of pixels an integer index according to the sorting;
   selecting an index such that less than a predetermined percentage of all other measured intensities of the subset of pixels are greater than a measured intensity at the selected index; and
   selecting the pixel from the subset of pixels that corresponds to the measured intensity value at the selected index.

8. A method for measuring a three-dimensional profile of an object, the method comprising:
   projecting, with a projector, structured light onto an object to generate fringe patterns on a surface of the object;
   capturing, with a camera, a first image of the surface of the object with a first exposure time, the first image including the fringe patterns on the surface of the object;
   determining a plurality of second exposure times;
   capturing, with the camera, at least one image of the surface of the object with each of the plurality of second exposure times, each including the fringe patterns on the surface of the object;
   generating, with the processor, at least one second image based on the at least one image captured with each of the plurality of second exposure times; and determining, with the processor, a three-dimensional profile of the surface of the object based on the fringe patterns captured in the at least one second image.

9. The method according to claim 8, the determining the plurality of second exposure times comprising:
   determining a first of the plurality of second exposure times based on the first image; and
   determining a second of the plurality of second exposure times based on the first of the plurality of second exposure times.

10. The method according to claim 9, the determining the second of the plurality of second exposure times comprising:
    determining a second scaling factor; and
    determining the second of the plurality of second exposure times based on the second scaling factor and the first of the plurality of second exposure times.

11. The method according to claim 10, the determining the second scaling factor comprising:
    setting a target maximum intensity value for the at least one second image;
    setting a first target minimum intensity value; and
    determining the second scaling factor based on the second scaling factor based on (i) the target maximum intensity value and (ii) the first target minimum intensity value.

12. The method according to claim 11, the determining the plurality of second exposure times comprising:
    capturing, with the camera, a third image of the surface of the object with the first of the plurality of second exposure times, the third image including the fringe patterns on the surface of the object;
    identifying a subset of pixels in the third image corresponding to the surface of the object; and
    determining a third of the plurality of second exposure times based on (i) the target maximum intensity value, (ii) the first target minimum intensity value, (iii) the second scaling factor, and (iv) the first of the plurality of second exposure times, in response to at least a threshold percentage of measured intensity values of pixels in the subset of pixels being less than first target minimum intensity value.

13. The method according to claim 12, the determining the third of the plurality of second exposure times comprising:
    determining a second target minimum intensity value based on (i) the first target minimum intensity value and (ii) the second scaling factor;
    determining a third scaling factor based on (i) the target maximum intensity value and (ii) the second target minimum intensity value; and
    determining the third of the plurality of second exposure times based on (i) the second scaling factor and (ii) the first of the plurality of second exposure times.

* * * * *